(12) United States Patent
Fette et al.

(10) Patent No.: US 6,560,445 B1
(45) Date of Patent: May 6, 2003

(54) RADIO COMMUNICATION SYSTEM AND METHOD OF OPERATION

(75) Inventors: Bruce Fette, Mesa, AZ (US); Peter J. Leahy, Scottsdale, AZ (US)

(73) Assignee: General Dynamics Decision Systems, Inc., Scottsdale, AR (US)

( * ) Notice: Subject to any disclaimer, the term of this patent is extended or adjusted under 35 U.S.C. 154(b) by 0 days.

(21) Appl. No.: 09/425,129

(22) Filed: Oct. 22, 1999

(51) Int. Cl.[7] .................................................. H04B 1/02
(52) U.S. Cl. ......................................... 455/91; 455/102
(58) Field of Search .............................. 455/91, 42, 43, 455/102, 108, 110; 375/260; 370/210

(56) References Cited

U.S. PATENT DOCUMENTS

| | | | | |
|---|---|---|---|---|
| 3,662,108 A | * | 5/1972 | Flanagan | 367/49 |
| 5,537,398 A | * | 7/1996 | Siwiak | 370/204 |
| 5,867,528 A | * | 2/1999 | Verbueken | 370/206 |
| 6,219,334 B1 | * | 4/2001 | Sato et al. | 370/210 |
| 6,304,611 B1 | * | 10/2001 | Miyashita et al. | 332/125 |

OTHER PUBLICATIONS

Ormsby, Charles D. Cepstral Processing for GPS Multipath Detection and Mitigation. Thesis. (Air Force Institute of Technology, Dec. 1997).*

Bingham, John A. C. Multicarrier Modulation for Data Transmission: An Idea Whose Time Has Come. IEEE Communications Magazine (May 1990), pp. 5–14.*

* cited by examiner

*Primary Examiner*—Nay Maung
(74) *Attorney, Agent, or Firm*—Jenner & Block, LLC (57) ABSTRACT

A new modulation/demodulation method and apparatus are described for use with RF communication. A transmitter (1001T) modulates information onto a plurality of carrier signals transmitted simultaneously over a corresponding plurality of frequencies using cepstral modulation. A receiver (1003R) receives the plurality of carrier signals and demodulates the signals utilizing cepstral demodulation. Receiver (1003R) monitors the carrier signals and in response to predetermined conditions selects a cepstral constellation to be utilized. Receiver (1003R) provides the cepstral constellation information to a transmitter (1003T) that, in turn, transmits the cepstral constellation information to a receiver (1001R), in turn, provides the cepstral constellation information to transmitter (100T). Transmitter (1001T) utilizes the selected cepstral constellation information to modulate the next transmission of the plurality of carrier signals.

69 Claims, 7 Drawing Sheets

RADIO COMMUNICATION SYSTEM AND METHOD OF OPERATION

FIELD OF THE INVENTION

This invention pertains to radio frequency communication, in general, and to method and apparatus for modulating and demodulating information onto radio frequency carrier, in particular.

BACKGROUND OF THE INVENTION

Spectrum is a precious resource. With increasing usage of spectrum, interference is of increasing concern. All radio frequency communication developed to date is subject to interference. The worst type of interference occurs with intentional jamming or overloaded spectrum usage. In addition, varying propagation conditions including propagation effects such as fading and multipath can produce substantial impairment of existing systems' ability to maintain exchange of information.

It is desirable to provide a type of modulation for radio frequency transmission that is relatively more robust at delivering information from transmitter to receiver in the presence of a large variety of interference. It is also desirable that such modulation type be robust to impairments introduced by the propagation effects of the channel. It is highly desirable to provide a communication system which will support many simultaneous users of a band of communication spectrum by distributing information within a modulation in ways that are different from all other modulations, thereby making other forms of modulations unlikely to interfere with communications utilizing this modulation.

BRIEF DESCRIPTION OF THE DRAWINGS

The invention will be better understood from a reading of the following detailed description in conjunction with the drawing figures in which like reference designators are used to identify like elements, and in which.

DETAILED DESCRIPTION

The present invention is directed to an entirely new method of radio frequency modulation. The modulation process utilized in the radio frequency (RF) system and method of the invention is based on performing modulation of information in a manner similar to the way all animals generate acoustic sounds for some form of communication. Animals create sounds using nonlinear processes that generate a rich spectrum of harmonics. This nonlinear process in human speech is called pitch frequency, and in the English language, it is modulated up or down to indicate emphasis. Secondly, the harmonic spectrum is modulated with multiple resonant frequencies (formants), and the motion of these frequencies toward important targets, known as pronunciation gestures, conveys the linguistic information in the English language. It is recognized that a room full of people all talking at the same time are all able to communicate in spite of overlap in spectrum and communication properties; we call this the "cocktail party effect." Humans use many techniques to achieve this ability. The present invention mimics many of the same functions performed acoustically in RF modulation technology to achieve the same ability to communicate utilizing RF in spite of all impairments of noise, propagation anomalies and other transmitters occupying the same bandwidth. In essence, the present invention is directed to a modulation in which RF signals are modulated with amplitude and frequency or phase versus time to create unique symbols in high dimensional space which can be recognized by any of several measurements able to be made upon the receivable signal components.

Animals use pulses of energy rather than constant energy output. The peak factor allows for communication over greater range at some average power level, although intervening silence intervals interrupt communications. This is a desirable tradeoff when the average power of transmission would not close the link over that extended range reliably.

In the description that follows, it is assumed that both transmitter and receiver have a clock that has been set to a common time as well as a common nonlinear process, such as cryptography, which can convert clock time into specifications of desired signal time slots allowing the receiver to focus on only parts of the received signal at the same time the transmitter might choose to transmit. In accordance with the invention the duty factor of such random burst transmissions (usually of data packets) is adjusted to match the number of members expected to participate in a net, thereby leaving each net member a time slot. When this is the case, all net members use the same time clock (for example Global Positioning System (GPS) time) and the same nonlinear algorithm (cryptographic algorithm) and will add an offset delay to that time which is based on their net number assignment which guarantees that no net members transmit at the same time; however, overlapped transmissions may occur at a receiver due to propagation delay. These minor overlaps may be removed by automated orthogonalization techniques. This burst time slot selection technique is not a requirement but may be used in conjunction with this invention and does emulate the nonlinear excitation properties of animal communications.

Figure 1:
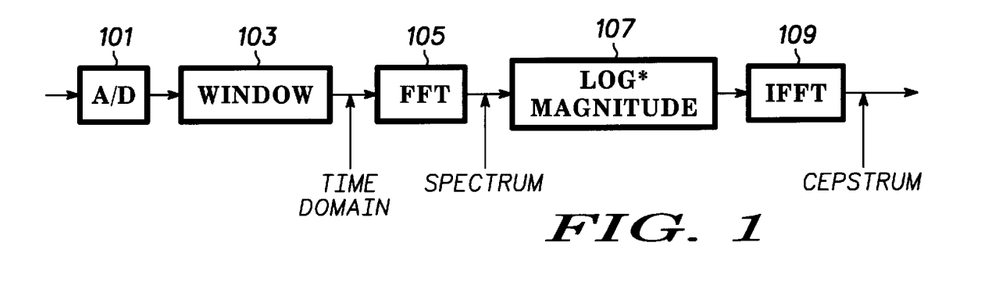
FIG. 1 is a block diagram illustrating formation of cepstrum.

In signal processing literature a "cepstrum" is defined as the inverse Fourier transform of the log magnitude of the Fourier transform of a signal. In accordance with the principles of the invention, an analog input signal is converted by an analog to digital (A/D) converter 101 as seen in FIG. 1. The digital output of A/D converter 101 is converted into a time domain signal at window 103 and applied to a Fast Fourier Transform processor 105 to produce a Fourier spectrum output. The log or root magnitude is formed over the spectrum output at a log magnitude functional block 107. The Inverse Fast Fourier Transform (IFFT) is formed over the output of the log magnitude functional block 105 by IFFT 109 to produce outputs that exhibit cepstrum. Similarly the phase or phase change may be extended from the FFT and then an IFFT may produce the WASTRUM.

Figure 2:
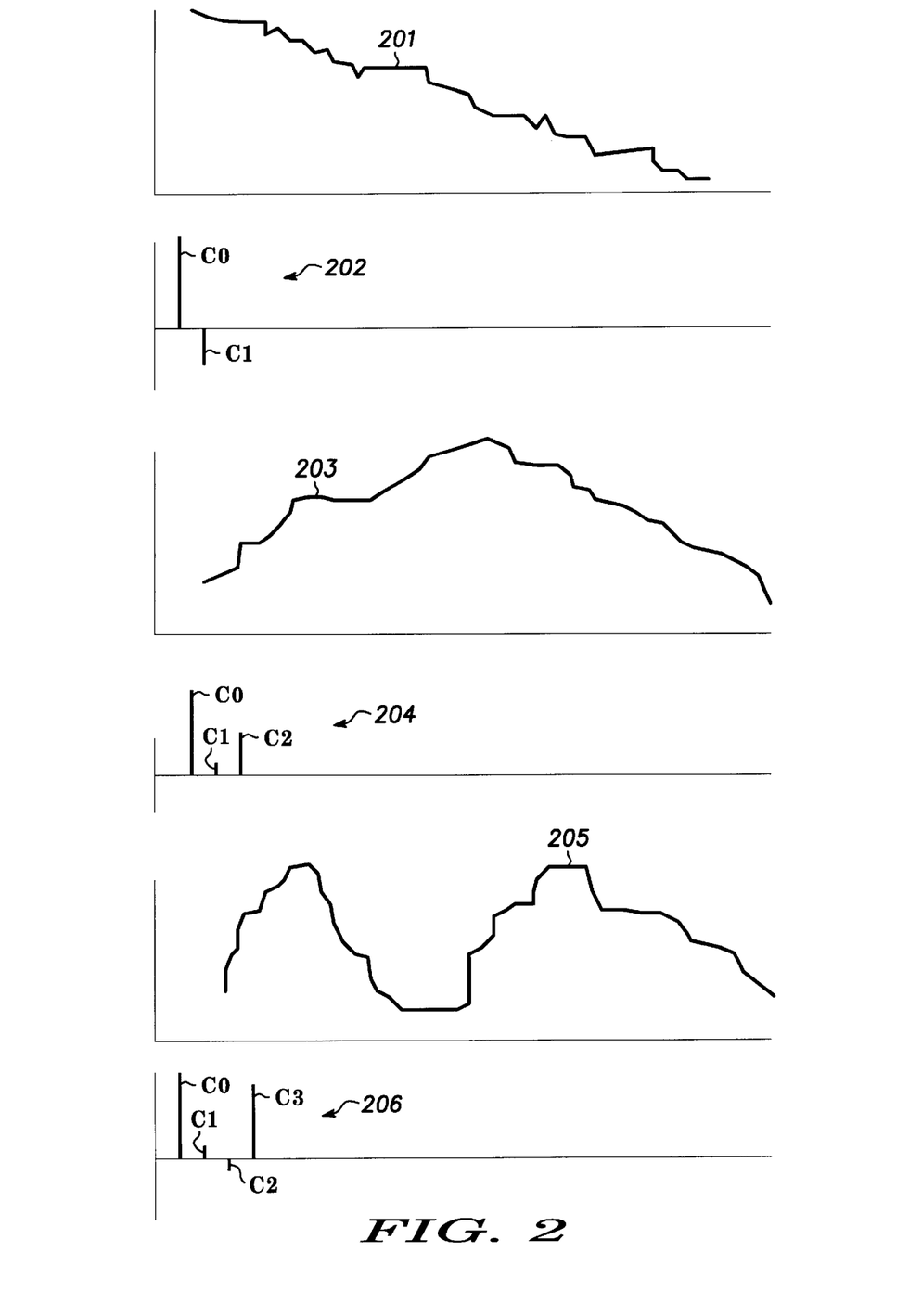
FIG. 2 illustrates three signal spectrums and corresponding cepstrum.

Turning to FIG. 2, three log magnitude signal spectrum curves 201, 203, and 205 are shown. Curves 201, 203, and 205 represent three outputs of log magnitude function 107 of FIG. 1. Curve 201 has a spectrum that is generally downward in slope. A cepstrum 202 for curve 201 has a first Cepstral coefficient C1, which is related to the slope of curve 201. C0 in all the cepstrum is the energy of the signal. The cepstral coefficients define the characteristics of the curve. Curve 203, which represents a single cycle of up slope and down slope, is characterized by a cepstrum 204 having both a first coefficient C1 and a second coefficient C2. C2 is the coefficient for the first cycle curvature. Because the curve 203 has the particular shape, the second coefficient is positive. Curve 205 is represented by a cepstrum 206 shown as having three cepstral coefficients C1, C2, and C3. C3 is the coefficient for the two cycle curvature. The higher cepstral coefficients represent higher curvature in the overall spectrum.

Carrier frequencies for this communication modulation are selected by a common time, a cryptographic process and a net member number. For example, if the communications band of interest consists of 16384 channels each capable of modulating 8000 bits per second, then receiver and transmitter pair choose a subset of those channels, say 128, which they will use at a given instance to modulate information. Since it is desirable for many other pairs of communicators to also be able to communicate over the same band at the same time and to minimize their intentional interference, it is desirable that all cooperating members of a network communication band use the common time and common cryptographic algorithm to select the carrier frequencies. Each pair of communicators will choose a net number and the net number will be combined with the cryptographic carrier selection in a way that guarantees no frequency overlap amongst the cooperating members. So, for example, if there are 128 pairs of communicators within a band, and each uses 128 carrier frequencies, this consumes the entire 16384 carrier frequencies without overlap in frequency, but provides a random set of frequencies for each pair of communicators. These carrier frequencies need not and preferably are not contiguous in the frequency spectrum.

Figure 18:
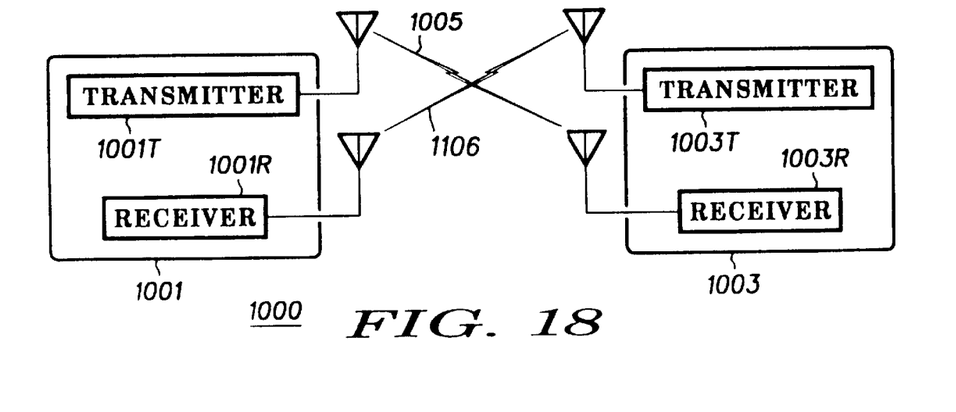
FIG. 18 is a block diagram of a system in accordance with the invention.

Turning to FIG. 18, a communication system 1000 in accordance with the invention includes a first transceiver 1001, having a first transmitter 1001T and a first receiver 1001R, and a second transceiver 1003, having a second transmitter 1003T and a second receiver 1003R. Transmitter 1001T is coupled via a communication link 1005 to receiver 1003R. Transmitter 1001T transmits information simultaneously via a plurality of cepstral modulated RF carrier signals over a plurality of corresponding frequencies to receiver 1003R. Receiver 1003R receives the plurality of cepstral modulated carrier signals and demodulates the plurality of cepstral modulated signals to extract the information.

Figure 3:
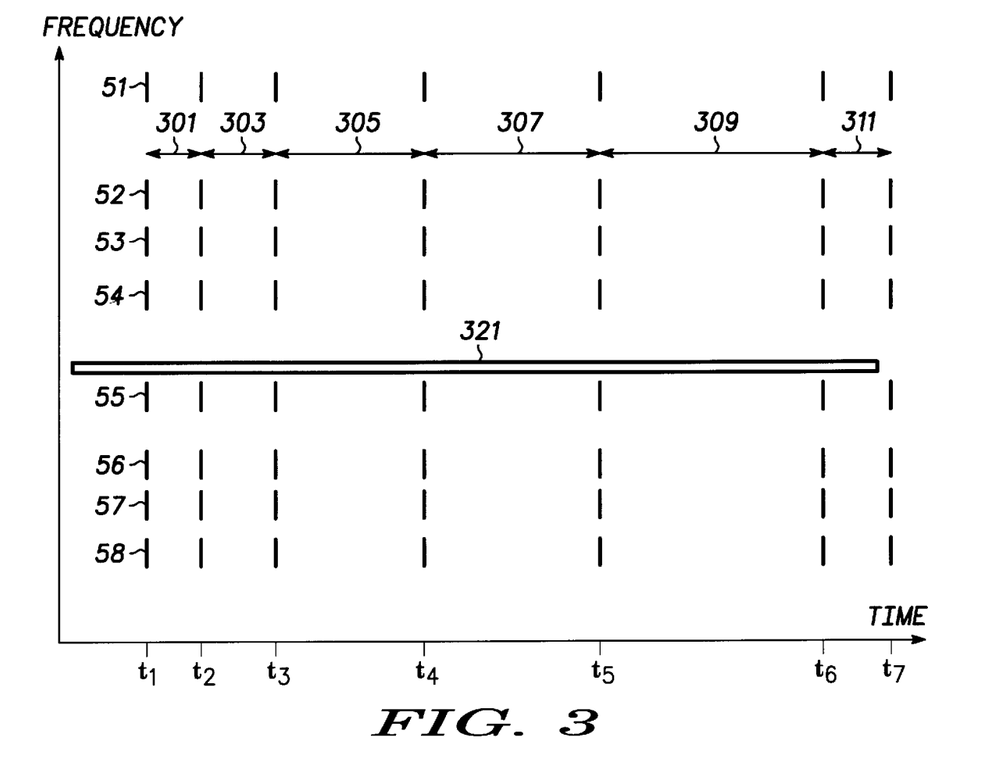
FIG. 3 illustrates the selection of carrier frequencies relative to an interfering signal.

An example of modulation in accordance with the invention is illustrated in the diagram of FIG. 3 in which, for reasons of clarity, only nine frequencies f0, f1, f2, f3, f4, f5, f6, f7, and f8 are shown. The frequencies are utilized at randomly selected burst intervals, i.e., the time intervals 301, 303, 305, 307, 309, and 311 are of random duration and are at randomly selected carrier frequencies to avoid interference, such as the narrowband interference shown at 321. With reference again to FIG. 17, each receiver 1003R, 1001R digitizes the entire received bandwidth of all channels. Each receiver 1003R, 1001R marks channels that are continuously filled with interference such as narrowband AM or FM transmitters, and can thereby choose to ignore measurement of modulation features on those disrupted channels, in effect marking those channel as erased or corrupted.

Each receiver 1003R, 1001R selects the desired carrier frequencies f1 through f8 and brings together measurements of the modulation properties on all the desired carriers and discards all other carriers from the remainder of the band, thereby creating the spectrum of the channels intentionally received.

Each transmitter 1001T, 1003T modulates frequency or phase versus time in such a way that the modulation information is impressed over all parts of the spectrum transmitted and therefore recoverable from whatever parts of the spectrum are received without interference.

Figure 4:
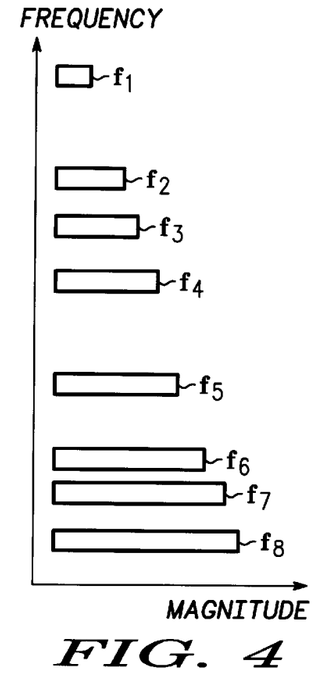
FIG. 4 is illustrates a frequency spectrum of the carrier frequencies of FIG. 3. for one baud.
Figure 5:
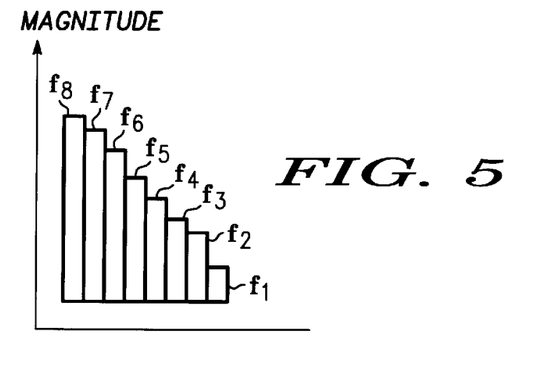
FIG. 5 is illustrates the magnitudes of the carriers of FIG. 4 in a compressed frequency spectrum.
Figure 6:
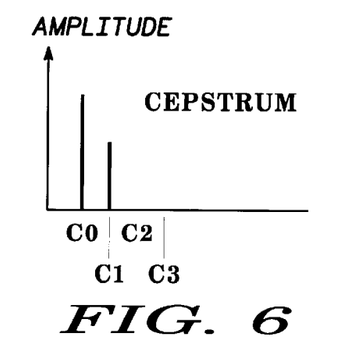
FIG. 6 is illustrates the cepstrum corresponding to FIG. 4.

Modulation is imposed upon the frequencies in a cepstral fashion. FIG. 4 is a plot of magnitude vs. frequency for the static cepstral modulation occurring at one time interval T1 in FIG. 3. FIG. 5 illustrates the static cepstral modulation of FIG. 4 in a compressed spectrum to illustrate more clearly the amplitude variation of the example. FIG. 6 shows the result of cepstral analysis of the cepstrum of FIG. 5.

It has been previously recognized that various forms of interference in time domain and/or frequency domain can be recognized and suppressed. In accordance with the present invention, interference in the cepstral domain is recognized and appropriately minimized when it is recognized as interference. Interference is usually recognized as a large impulse that significantly exceeds the normally expected signal power.

In the time domain, RF communication interference often occurs due to lightning wherever it may occur in the world. It may also occur due to engine ignition noise, radar, or due to nearby burst transmissions not coordinated by automated orthogonalization. Impulses in the time domain are easily recognized as high energy events where the rms energy in a short window exceeds the average of rms energy in that window averaged over a longer time. When such impulses occur in the time domain, they may be recognized, and the time interval may be marked as interfered or may simply be zeroed. With a well chosen false alarm rate for detecting such events, suppression of time domain impulse interference may be achieved.

Similarly, narrowband transmissions from other communications systems not part of an automated orthogonalized network may be recognized as narrow frequencies in the frequency domain, which have much higher energy than the average energy over the desired spectrum of interest. These may also be marked as interference or may be zeroed. Similarly, 60 to 80 dB of suppression of such narrowband frequency interference is possible in the frequency domain. Conversion to the frequency domain is usually performed by windowing the time domain information with a suitable window (for example, a Hamming Window) and then performing a Fast Fourier Transform with a reasonably large number of points (1024, for example) and then taking the magnitude of the energy at each frequency. The noise floor of the spectrum and a threshold for detecting and removing narrowband interference are best accomplished with a histogram, which will clearly identify a large number of hits at the energy of the noise floor and relatively few high energy hits and the energy of those hits which then quantifies a threshold for detecting narrowband interference that can be removed.

As described with reference to FIG. 1, cepstrum is calculated by performing the log magnitude of the (double sided) spectrum, and then performing a Fast Fourier Transform on this data. Relatively few people are familiar with cepstrum properties. It is best recognized as a way to separate the convolution of the vocal tract filter function from the excitation. In general, the cepstral process separates convolution in the time domain into a multiplicative or log additive process in the frequency domain. It has other important properties as well that allow it to recognize the noise floor of wideband noise, and to thereby suppress wideband noise. This property may be seen as follows: the average energy of the noise floor is seen by the second FFT as a DC or constant value and therefore shows up as a spike at DC in the frequency domain. Thus noise energy and any energy from spread spectrum signals is compressed onto the DC axis and can thereby be suppressed as are spikes in the time and frequency domains.

Cepstrum also discovers the properties of the communications channel due to multi-path and other propagation considerations. If a transmission has uniform energy over its entire bandwidth (as in white noise), the reflections of that signal off of buildings, cars, lamp posts, airplanes, etc. introduce a delayed replica of the signal. At some frequencies, this replica may cause destructive interference to the direct path signal and at other frequencies constructive enhancement. In the cepstral domain, these propagation effects show up as a long term offset in cepstral coefficients at low frequencies (C1 through C10). If signals are modulated in the frequency domain, these channel propagation features may be removed by subtracting the average value of each low cepstrum coefficient (C1 through C10).

The spectral shape of received signals may be measured by examining the low order cepstral coefficients, i.e. cepstral coefficients C1 through C10. C1 represents the slope of the spectrum. Higher energy at lower frequencies and lower energy at higher frequencies (commonly occurring due to propagation) causes a positive C1. C2 represents the curvature of the spectrum from low to mid to high. Relatively more energy in mid spectrum will cause a positive C2 while relatively more energy at low and high spectrum will cause a negative C2. Similarly, cepstral coefficients C3 through C10 describe the spectral shape as relatively faster variations as the spectrum is scanned from low to high frequency.

Even if a few carriers of transmission are obscured, the cepstrum can recover the relative shape properties of the other received cepstrally modulated and transmitted signals. To maximize the separation of interference from other transmission types, a constellation of modulation properties is defined in the cepstrum and then converted back into a variety of magnitudes to impress onto the carrier frequencies that have been selected for transmission. This process can be used to define cepstral constellations that support from one bit to as many as 10 bits. The allocation of bits to cepstral modulation patterns need not be one bit to one cepstrum, but may preferably be done with a vector quantization strategy such that all cepstrum values convey all the bits, each showing up as a unique spectral shape (or equivalently a unique sound if the signals were audible rather than RF).

This amounts to amplitude modulation of all channels in some way that the amplitude contour impressed over many carriers is recoverable from any reasonable subset of carriers actually received. Any carriers recognizably interfered are simply marked as interfered and not used in the cepstral analysis. If there are significantly more carriers than cepstral coefficients calculated and more cepstral coefficients calculated than bits delivered, there is high processing gain and high ability to communicate in high interference.

In a similar fashion, by introducing phase changes onto all carrier frequencies in a way that the information bits delivered cause effects in phase on all carrier frequencies received, it becomes possible to distribute the information bits so that they can be recovered over any reasonable subset of non-interfered received signal. While this is not strictly a cepstrum, the signal processing is performed in a similar manner, but rather than modulating the magnitude of the spectral shape we modulate all carriers with some type of carrier phase change. For example, suppose two bits are to be sent and that four phase change constellations are defined, one for each possible dibit. Dibit 00 may produce all positive angle phase changes and dibit 11 may produce all negative phase changes and the other two combinations may produce positive phase changes at low frequency and negative phase changes at high frequency or vice versa.

Figure 7:
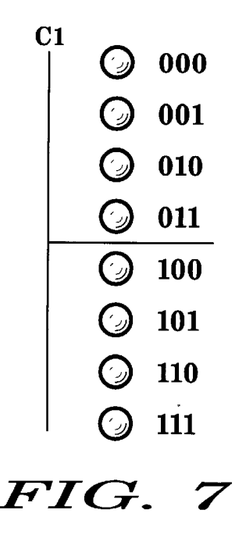
FIGS. 7, 8, and 9 illustrate static cepstral modulation constellations.
Figure 8:
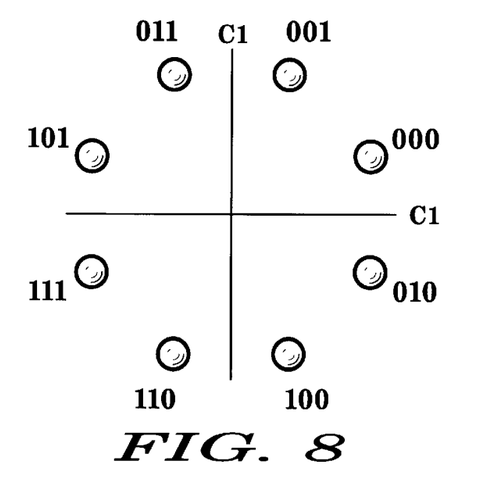
Figure 9:
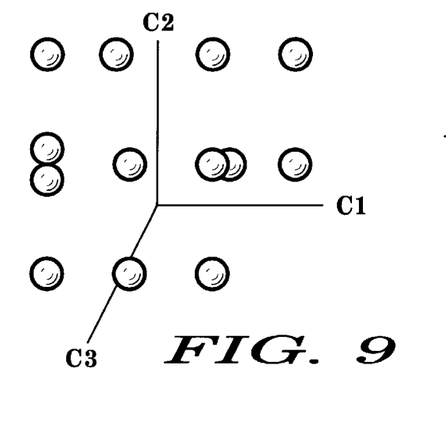

FIGS. 7, 8, and 9 illustrate examples in which the cepstrum utilizing one, two and three cepstrum, respectively, have been modulated to convey three bits worth of information. In the one dimensional process, any cepstrum may be chosen, such as, the first cepstral line, C1. In FIG. 7, eight different values are chosen to represent three different bits along the Cepstral axis. In FIG. 8, a two dimensional Cepstrum is shown in which the first and second cepstral lines, C1, C2, are utilized and assigned the eight different values to pass three bits worth of information. In FIG. 9, the same process is shown with the first, second and third cepstral lines.

In accordance with one aspect of the invention, a simplified receiver design 1003R, 1001R as shown in FIG. 18 need not actually convert a signal representation into the cepstral domain. Each receiver 1003R, 1001R correlates expected phase changes over the entire non-interfered spectrum with the measured phase changes or correlates received magnitude spectrum against transmitted spectral shape. However, true ability to mitigate channel artifacts is much easier in the cepstral domain, and the signal processing is seen to be cepstral in its basis of design.

Under the worst possible interference, such as in the case of intentional jamming or overloaded spectrum the ability to separate the desired signal from the interference requires even greater focus of attention. In these cases a sequence of modulations is created that causes a sequence of changes of cepstral values. The ability to demodulate the desired signal and ignore the interference then arises from the ability to observe those parts of received symbols that correctly track paths defined for the cepstral coefficients and to ignore trajectories which show evidence of interfering phenomenon.

Figure 10:
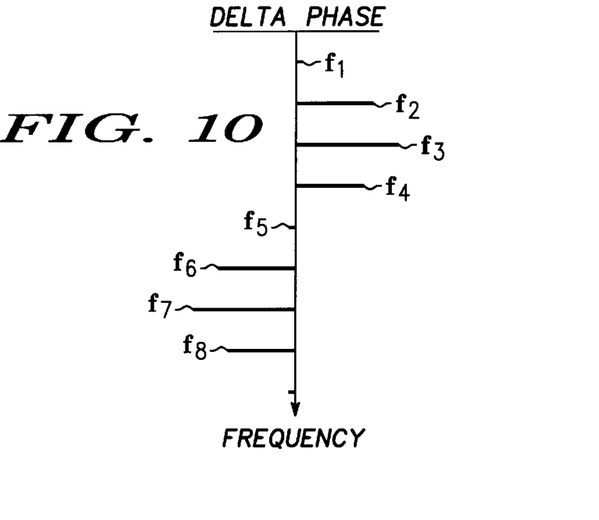
FIG. 10 illustrates the phase modulation at a time in FIG. 3.
Figure 11:
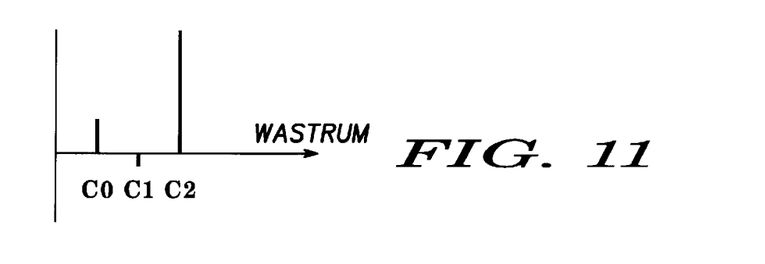
FIG. 11 illustrates the cepstrum of FIG. 10 in the Wastrum domain.

The cepstral concept can be used with amplitude modulation of each of the spectral lines. However, in accordance with the principles of the invention, delta phase modulation onto the plurality of carrier frequencies may be used as indicated by the phase modulation diagram of FIG. 10. FIG. 10 illustrates the phase modulated signals at time T1 of FIG. 3. The cepstral coefficients for the delta phase modulation of FIG. 10 is shown in FIG. 11. FIG. 11 plots the magnitude of the coefficients in the Wastrum. "Wastrum" is the cepstral equivalent of the phase angle spectrum. As is shown, for the delta phase modulation of FIG. 10, cepstral coefficients C0, C1, and C2 are plotted in the Wastrum of FIG. 11.

Figure 12:
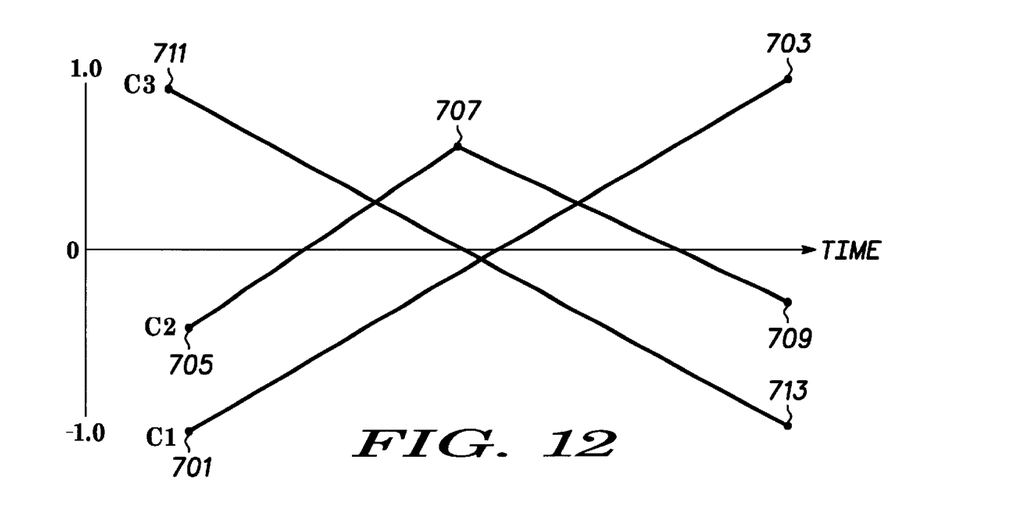
FIG. 12 is a plot of cepstral trajectory modulation.

The trajectories of the cepstral coefficients may be used to define "1" and "0". FIG. 12 illustrates a trajectory of cepstral modulation where one baud consists of a change in the first cepstrum coefficient C1 from low 701 to high 703, which is defined as representing a "1". A second example is using the second cepstral coefficient C2 making a transition from low 705 to high 707 and then back to low 709. A third example utilizes the third cepstral coefficient C3 making a transition from a high 711 to a low 713. Various combinations of the cepstral coefficients in various patterns versus time may be used to convey Boolean information.

Assume for purposes of explanation that an information symbol consists of a sequence of N partial symbols (as a large number of sounds in sequence make a word). Further assume that one bit of information consists of a sequence of 16 cepstrally defined partial symbols. Over this sequence of N partials, perhaps some cepstral coefficients have a continuous slope and perhaps others exhibit a curvature.

In addition to the interference suppression techniques described above for time, frequency and noise suppression, when there is intense babble similar to that of the intended modulation, interference must be suppressed in the cepstral demodulation process. Cepstral sequences may be compared against the symbol constellations in all defined dimensions. The sequence for C1 is compared against the defined sequence for C1, etc. Where sequences match within prescribed tolerances for each partial transition that can be taken as evidence for the reported symbol. When cepstral sequences fall outside of tolerance for a trajectory sequence, that feature can be ignored as having been interfered during the interval when it is out of tolerance. The net result of this trajectory modulation is that demodulation consists of all the standard time, frequency, cepstrum interference suppressions and in addition is an M+1 dimensional weighted pattern match, where M is the number of cepstral coefficients modulated with time over the symbol and the remaining dimension is time.

Trajectory modulation shown in FIG. 12 is performed with cepstral amplitude partial symbols or with cepstral like differential phase modulations.

The modulation technique defined here enables communications over all known types of intentional jamming and poor propagation conditions and most importantly lends itself to a network of communications equipment all operating in automatic orthogonalization. This modulation is orthogonal to narrowband and to spread spectrum modulations and thereby provides an important third choice of modulation that will not interfere with the other two modulations.

This invention defines optimal modulation symbols to deliver information at the highest delivery rate practical, given the current link bandwidth and signal to interference ratio. Since the optimal modulation symbol set for a cepstral modulation system may change as a function of signal to interference ratio, this design process will locate global optimum symbol sets and allow these symbol sets to be selected for use in modulation during intervals experiencing a specific level of interference.

Each transmitter 1001T, 1003T of system 1000 in FIG. 18 includes an automatic orthogonalization system that tunes the properties of a transmitter to optimize the local link performance as measured at receiver 1003R, 1001R. It may also be advantageous to use spectral and cepstral demodulation strategies to enable identification of time domain burst interference, narrowband spectral interference and wideband spread spectrum interference. Each of these may be excised in one of these domains.

After excising these interference signals, the cepstral domain allows identification of the channel link properties, which largely show up as direct current (DC) offsets to low order cepstrum C1, C2, etc.

Assuming that cepstral modulation is accomplished by either amplitude modulation of or by phase modulation of the plurality of carrier signals, or both, it is possible to create a simulation of link conditions resembling the current link conditions. Within this simulation current types of interference from other signals, current multi-path properties of the link and gaussian noise can all be modeled. Then the ability to detect modulation on each cepstral coefficient can be measured and converted to the information carrying capacity of that cepstral coefficient.

In the simulation, all cepstral coefficients are modulated with random noise, ranging over the values −1 to +1. This may be performed one coefficient at a time or in multiples of coefficients or even all coefficients, each with independent noise. The simulation of many baud of communication is performed (assume at least 10 times the number of bits to be delivered under these conditions). The receive simulation decodes and recovers the cepstral coefficients, which can now be correlated with those coefficients transmitted. This correlation now provides evidence of the signal to noise ratio (SNR) of each cepstral coefficient and its ability to convey information. This process will also produce a model of how the various forms of interference degrade or offset the cepstral coefficients. Also, certain types of interference may be detected and eliminated by recognizing that a certain cepstral coefficient was always modulated to be zero and that, by receiving as non-zero, the location of interference may be recovered in the spectrum and its artifact removed.

Modulation constellations for cepstrum can be one-dimensional (scalar) as shown in FIG. 7, two-dimensional (as is done in quadrature modulation) and as is shown in FIG. 8, three-dimensional as shown in FIG. 9, or higher. In principle, for very high SNR situations, all dimensions of cepstrum could be modulated with a very high dimensionality table. If we choose to create two or three-dimensional modulation constellations for cepstral coefficients, we can also choose which coefficients to cluster together in sets of two or three. They need not be consecutive. As in prior systems, the ability of a signal to deliver Boolean information is a function of the signal to noise ratio of the communications channel.

Figure 13:
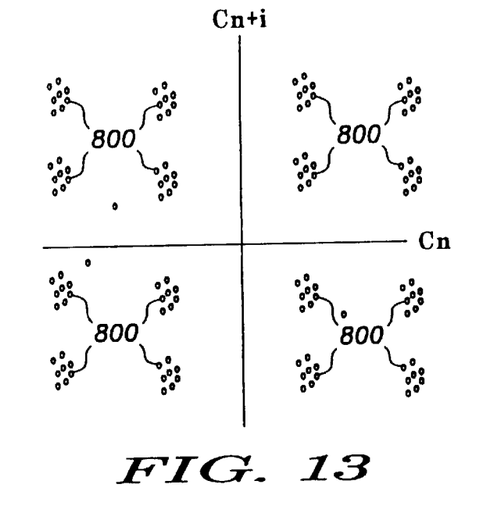
FIGS. 13, 14, 15, and 16 illustrate typical cepstrum receive constellations under high, moderate, poor and very poor signal noise ratio conditions.
Figure 14:
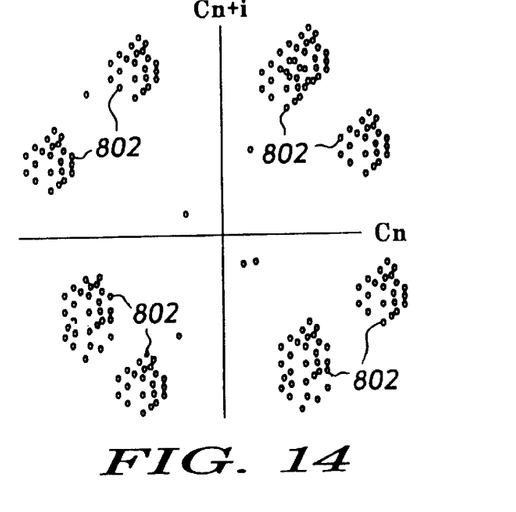
Figure 15:
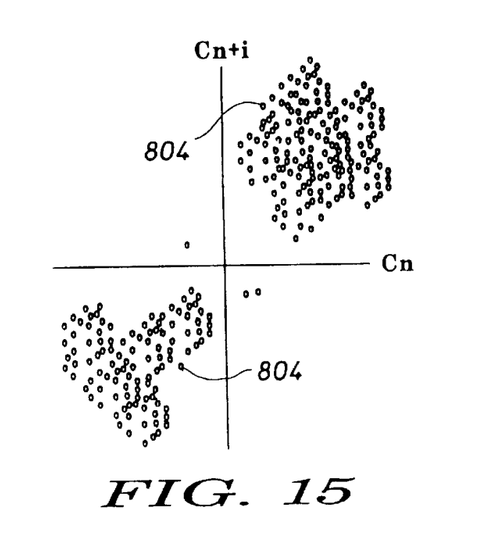
Figure 16:
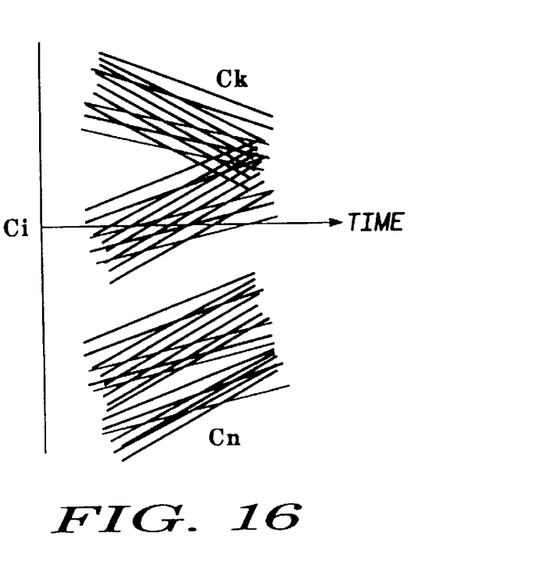

FIGS. 13, 14, 15, and 16 illustrate constellations that represent two cepstral lines that have been measured with the cepstral modulation process. When SNR is high as shown in FIG. 13, tight clusters occur. When SNR is lower, a broader distribution of clusters occurs, and fewer clusters are used in order to tell the difference between different symbols. For example, FIG. 13 illustrates a receive constellation under high SNR conditions, and 16 symbols 800 are shown. With 16 symbols, four bits of information can be delivered. In FIG. 14 which illustrates a receive constellation under moderate SNR conditions, 8 symbols 802 are shown. With eight symbols, three bits of information can be delivered. Under poor SNR as shown in FIG. 15, only two symbols 804 are shown. As SNR gets even poorer, there is less space between clusters so the cluster structure is changed as indicated in FIG. 16. By changing the cluster structure, more performance may be obtained from a communication system in accordance with the invention. Thus in accordance with one aspect of the invention, SNR is measured, and a constellation is chosen to provide the optimum performance either by a predetermined correlation of constellations and SNR or by trying different constellations to obtain best performance. In either case, the communication system selects a coefficient constellation based upon SNR. In other words a constellation strategy is selected from available constellation strategies to be effected least by interference. The selection may be performed in real time on and a communication link to revise performance of the link as conditions change.

Figure 17:
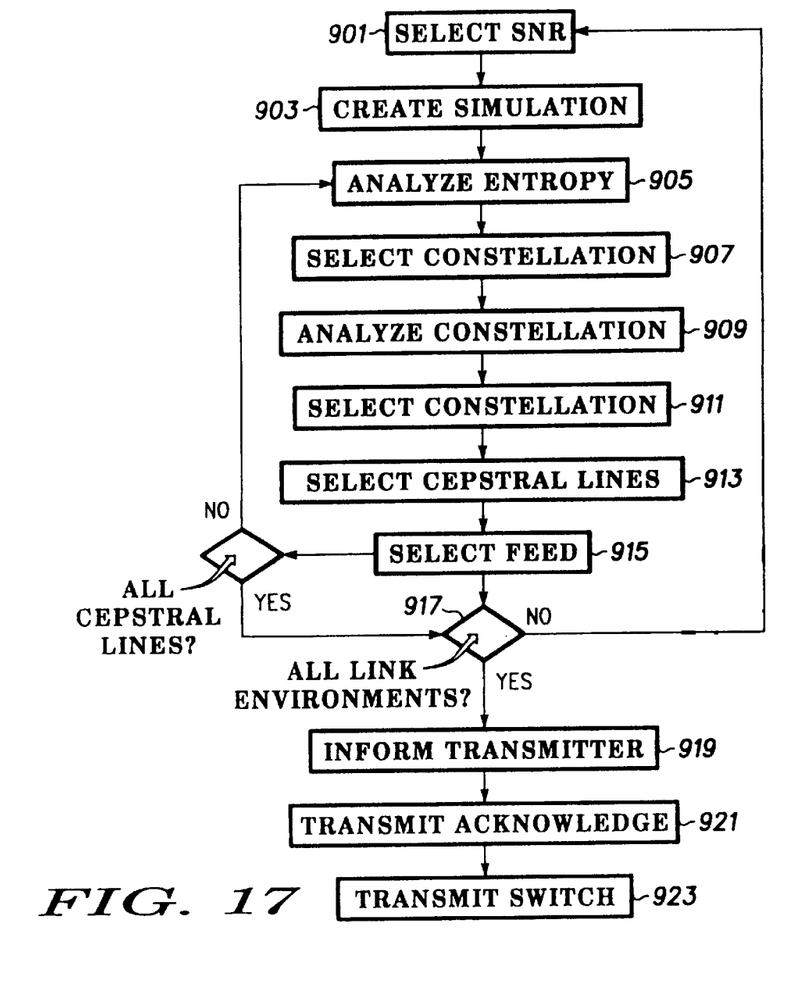
FIG. 17 is a flow diagram of operation of a system in accordance with the invention.

FIG. 17 is a flow diagram of the method of determining a constellation to be used, and FIG. 18 illustrates in block diagram form a communication system in accordance with the invention.

Receiver 1003R includes a processor that initially, at step 901 selects a first SNR in the range of SNR for the expected communication environment of communication link 1005 FIG. 18) is selected. For an expected 30 dB range of SNR over communication link 1005, a "do" loop is established for increments of the expected range. In the embodiment shown, 3 dB increments are utilized. A simulation creates typical noise and interference at step 903. The entropy of each cepstral coefficient is analyzed at step 905. In other words, at step 905, SNR is measured for each cepstral coefficient. At step 907 candidate constellations are selected. At step 909 the information carrying capacity of each constellation is analyzed under the SNR. At step 911, a constellation is selected that delivers the highest information rate subject to an upper bit error rate bound of the associated forward error correcting code. For example, assume that a Reed-Salomon error correcting code is used with the process and that it is capable of correcting bit error rates up to three per cent in the raw information. If a constellation raw bit error rate exceeds the error correcting capacity of the error correcting code, it would not be selected. The selected constellation will be the constellation that has the highest information throughput and does not exceed the raw bit error rate capacity of the error correcting code. At step 913, a selection is made of cepstral lines to use in the selected constellation. At step 915, an error correcting code is selected. The error correcting code may be any of a number of known error correcting codes. Steps 905 through 913 are repeated for all cepstral lines. Steps 901 through 915 are repeated for each SNR for the communication link 1005 environment. The result is a table or set of tables that permit automatic optimization of the communications link under varying conditions. At step 917 receiver 1003R (FIG. 18) determines if the link conditions are stable and signals mode changes as required to maintain the quality of communication. At step 919, receiver 1003R informs transmitter 1001T of constellation, cepstral lines, FEC, and baud rate for current conditions. At step 921, transmitter 1001T (FIG. 18) acknowledges receipt of the information. At step 923, transmitter 1001T switches to the selected mode on the next baud. As receiver 1003R assesses the performance of the demodulation constellation on a live signal, it selects a model of SNR nearest to the actually received SNR, and signals transmitter 1001T via transmitter 1003T and second link 1007 to receiver 1001R of selected constellations for that SNR. As transmitter 1001T shifts to that constellation, receiver 1003R invokes the appropriate constellation for the current SNR, thereby enabling the maximum available throughput performance under current link conditions.

The technique defined here can result in both transceiver 1001 (FIG. 18) and transceiver 1003 (FIG. 18) cooperating to deliver the maximum available information rate under given link conditions using either cepstral amplitude or cepstral phase modulation or both.

In FIG. 18, a communication system 1000 in accordance with the invention utilizes a type of modulation for radio frequency transmission that is robust at delivering its information from transmitter 1001T to receiver 1003R in the presence of a large variety of types of interference. Such interference may include unintentional interference as well as intentional interference. Examples include narrowband transmissions such as amplitude modulation (AM), frequency modulation (FM), phase shift keys (PSK) and wideband transmissions such as direct spread spectrum or frequency hopped spread spectrum. Communications with a system 1000 in accordance with the invention is robust to impairments introduced by the propagation effects of the communications link 1005 such as fading and multi-path. Communication system 1000 in accordance with the invention robustly support many users communicating over the same band of radio frequencies in the most effective manner possible. The additional modulation modes provide automatic orthogonalization of many simultaneous users of a band of communications spectrum by distributing the information within the modulation in ways that are entirely different from all other modulations, thereby making other forms of modulation unlikely to interfere with this form of modulation. It is an intention of this invention to provide multiple nonlinear techniques to avoid integration of interference into the baud decision in order to maximize communication efficiency.

Figure 19:
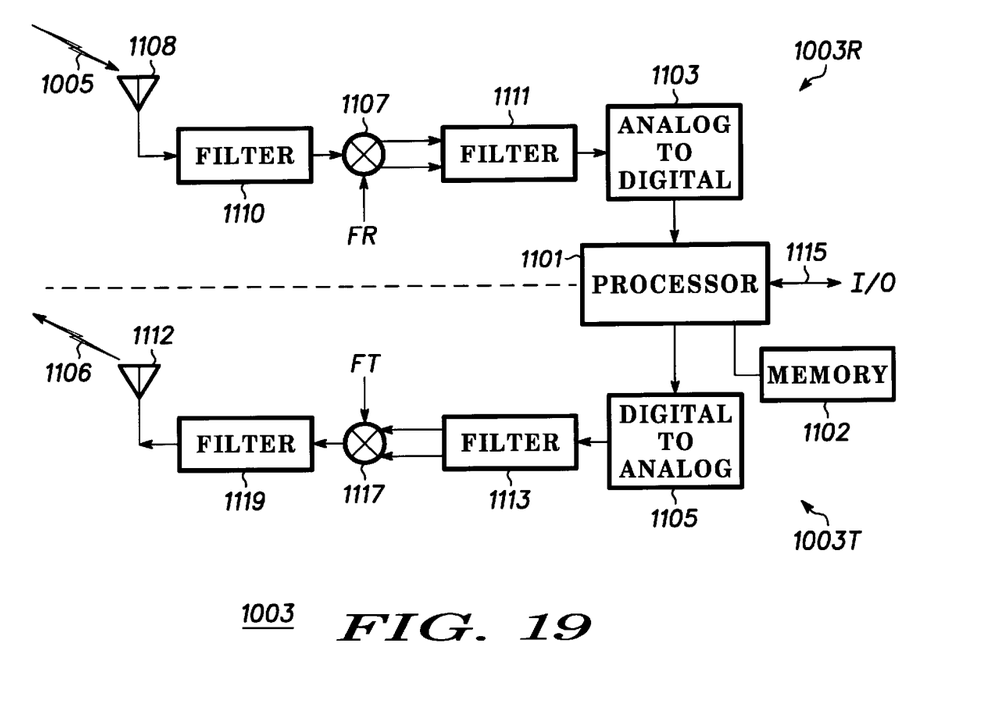
FIG. 19 is a block diagram of a transceiver in accordance with the invention.

Turning now to FIG. 19, transceiver 1003 is shown in greater detail. Transceiver 1003 includes a transmitter 1003T and a receiver 1003R. A processor 1101 coupled to a memory 1102 is used in common by transmitter 1003T and receiver 1003R. Memory 1102 includes both random access memory and read only memory. Processor 1101 is a digital signal processor or a type commercially available or alternatively may be a field programmable gate array. Processor 1101 and memory 1102 are configured to perform the process set forth above. Processor 1101 interacts with an analog to digital converter 1103 to receive samples representative of received signals. The signals from communications link 1005 are received at an antenna 1108, filtered by a filter 1110 and processed by a receiver front end 1107 to produce analog signals that are applied to a filter 1111 and supplied to analog to digital converter 1103. Processor 1101 processes the digital output of analog to digital converter 1103 to produce intelligent output at an I/O bus 1115. Similarly, various inputs such as voice or data may be applied to I/O bus 1115 for transmission to another transceiver such as transceiver 1001 shown in FIG. 18. The information is processed to provide cepstral modulation by processor 1101. The digital data stream generated by processor 1101 is applied to a digital to analog converter 1105, filtered by a filters 1113 and 1119, applied to a transmit signal source 1117, and transmitted over an antenna 1112 via link 1106.

The invention has been described in terms of various embodiments. It will be appreciated by those skilled in the art that various changes and modifications may be made to the various embodiments without departing from the spirit or scope of the invention. It is further intended that the invention not be limited in scope by the particular embodiments shown and described herein. It is intended that the invention be limited in scope only by the claims appended hereto.

What is claimed is:

1. A method of operating a radio communication system comprising the steps of:

selecting a plurality of carrier frequencies for a plurality of communication signals transmitted by a radio transmitter and received by a radio receiver; and modulating information on said plurality of communication signals, said modulating being cepstral modulation.

2. A method in accordance with claim 1, comprising:

transmitting said plurality of communication signals on said plurality of carrier frequencies at randomly selected burst intervals.

3. A method in accordance with claim 2, comprising:

receiving said plurality of communication signals; and measuring cepstral modulation properties on a plurality of selected signals selected from said plurality of communication signals.

4. A method in accordance with claim 3, comprising:

ignoring cepstral modulation properties of unselected signals, said unselected signals comprising those signals of said plurality of communication signals that are not selected.

5. A method in accordance with claim 4, wherein:

said unselected signals are subject to disruption.

6. A method in accordance with claim 5, wherein:

said unselected signals are transmitted over frequencies subject to interference.

7. A method in accordance with claim 5, wherein:

said unselected signals are subject to propagation anomalies.

8. A method in accordance with claim 3, comprising:

selecting a cepstral constellation for said cepstral modulation.

9. A method in accordance with claim 8, comprising:

said cepstral constellation selection is performed in accordance with a predetermined function.

10. A method in accordance with claim 9, wherein:

said predetermined function is determined by a predetermined correlation between said cepstral constellation and SNR of said plurality of communication signals.

11. A method in accordance with claim 10, comprising:

monitoring predetermined conditions of said plurality of carrier frequencies.

12. A method in accordance with claim 1, comprising:

identifying a plurality of predetermined cepstral constellations, each cepstral constellation corresponding to a predetermined communication condition of a corresponding plurality of predetermined communication conditions;

monitoring predetermined conditions of said plurality of carrier frequencies; and selecting a first cepstral constellation from said plurality of predetermined communication conditions based upon said monitored predetermined conditions of said plurality of carrier frequencies.

13. A method in accordance with claim 12, comprising:

selecting a second cepstral constellation when said monitored predetermined communication conditions correspond to a second one of said plurality of predetermined communication conditions.

14. A method in accordance with claim 13, wherein:

said predetermined conditions comprise SNR.

15. A method in accordance with claim 12, wherein:

said predetermined conditions comprise SNR.

16. A radio communication system comprising:

a transmitter comprising a generator operable to simultaneously generate a plurality of carrier signals each at a different one of a corresponding plurality of frequencies; and a modulator for modulating information onto said plurality of carrier signals utilizing cepstral modulation.

17. A radio communication system in accordance with claim 16, comprising:

said transmitter transmitting said plurality of carrier signals at randomly selected burst intervals.

18. A radio communication system in accordance with claim 17, comprising:

said transmitter transmitting selected ones of said plurality of carrier signals over randomly selected ones of said plurality of carrier frequencies.

19. A radio communication system in accordance with claim 18, comprising:

a receiver operable to receive said plurality of carrier signals; and said receiver being operable to demodulate cepstral modulation on desired ones of said plurality of carrier signals.

20. A radio communication system in accordance with claim 19, comprising:

said receiver being operable to avoid demodulating cepstral modulation on undesired ones of said plurality of communication signals.

21. A radio communication system in accordance with claim 20, wherein:

said undesired ones of said plurality of carrier signals are disrupted.

22. A radio communication system in accordance with claim 20, wherein:

said undesired ones of said plurality of carrier signals are subject to interference.

23. A radio communication system in accordance with claim 20, wherein:

said undesired ones of said plurality of carrier signals are subject to propagation anomalies.

24. A radio communication system in accordance with claim 19, comprising:

said receiver identifying a cepstral constellation in accordance with a predetermined function; and said receiver operable to communicate said identified cepstral constellation to said transmitter.

25. A radio communication system in accordance with claim 24, comprising:

said transmitter being operable to communicate with said receiver to receive said identified cepstral constellation and to select a cepstral modulation utilizing said identified cepstral constellation.

26. A radio communication system in accordance with claim 24, wherein:

said receiver is operable to determine said predetermined function by a predetermined correlation between said identified cepstral constellations and SNR of said plurality of carrier signals.

27. A radio system communication system in accordance with claim 26, comprising:

said receiver automatically monitoring predetermined conditions at said plurality of carrier frequencies; and said receiver utilizing said monitored predetermined conditions to select a cepstral constellation.

28. A radio communication system in accordance with claim 16, comprising:

said receiver being operable to identify a plurality of predetermined cepstral constellations each corresponding to a predetermined communication condition of a corresponding plurality of predetermined communications conditions;

said receiver monitoring predetermined conditions of said corresponding plurality of carrier frequencies; and said receiver selecting a first cepstral constellation from said plurality of predetermined communication conditions based upon said monitored predetermined conditions of said corresponding plurality of carrier frequencies corresponding to one of said plurality of predetermined communication conditions.

29. A radio communication system in accordance with claim 28, comprising:

said receiver being operable to select a second cepstral constellation when said monitored predetermined conditions correspond to a second one of said plurality of predetermined communication conditions.

30. A radio communication system in accordance with claim 29, wherein:

said predetermined conditions comprise SNR of said plurality of carrier signals.

31. A radio communication system in accordance with claim 28, wherein:

said predetermined conditions comprise SNR of said plurality of carrier signals.

32. A radio receiver, comprising:

means for receiving a plurality of carrier signals received on a corresponding plurality of carrier frequencies, said plurality of carrier signals being modulated with cepstral modulation;

means for extracting information from said plurality of carrier signals by using cepstral demodulation on desired ones of said plurality of carrier signals; and means for said receiver to identify undesirable ones of said plurality of carrier frequencies and to avoid demodulating carrier signals received on said undesirable ones of said plurality of carrier frequencies.

33. A radio receiver in accordance with claim 32, wherein:

said carrier signals received over said undesired ones of said plurality of carrier frequencies signals are disrupted.

34. A radio receiver in accordance with claim 32, wherein:

said carrier signals received on said undesired ones of said plurality of carrier frequencies are subject to interference.

35. A radio receiver in accordance with claim 32, wherein:

said carrier signals received on said undesired ones of said plurality of carrier frequencies are subject to propagation anomalies.

36. A radio receiver, comprising:

means for receiving a plurality of carrier signals received on a corresponding plurality of carrier frequencies, said plurality of carrier signals being modulated with cepstral modulation;

means for extracting information from said plurality of carrier signals by using cepstral demodulation on desired ones of said plurality of carrier signals;

means for identifying a cepstral constellation in accordance with a predetermined function; and means for communicating said identified cepstral constellation to a transmitter of said plurality of carrier signals.

37. A radio receiver in accordance with claim 36, comprising:

means for selecting said predetermined function by a predetermined correlation between said identified cepstral constellations and SNR of said plurality of carrier signals.

38. A radio receiver in accordance with claim 37, comprising:

a processor operable to automatically monitor for predetermined conditions on said plurality of carrier frequencies; and said processor utilizing said monitored predetermined conditions to select a one of said identified cepstral constellations.

39. A radio receiver, comprising:

means for receiving a plurality of carrier signals received on a corresponding plurality of carrier frequencies, said plurality of carrier signals being modulated with cepstral modulation;

means for extracting information from said plurality of carrier signals by using cepstral demodulation on desired ones of said plurality of carrier signals; and a processor operable to identify a plurality of predetermined cepstral constellations each corresponding to a predetermined communication condition of a corresponding plurality of predetermined communications conditions;

said processor monitoring predetermined conditions of said plurality of carrier frequencies; and said processor selecting a first cepstral constellation from said plurality of predetermined communication conditions based upon said monitored predetermined conditions of said plurality of carrier frequencies corresponding to one of said plurality of predetermined communication conditions.

40. A radio receiver in accordance with claim 39, wherein:

said processor selects a second cepstral constellation when said monitored predetermined conditions correspond to a second one of said plurality of predetermined communication conditions.

41. A radio receiver in accordance with claim 40, wherein:

said predetermined conditions comprise SNR of said plurality of carrier signals.

42. A radio receiver in accordance with claim 39, wherein:

said predetermined conditions comprise SNR of said plurality of carrier signals.

43. A radio receiver in accordance with claim 39, comprising:

a memory coupled to said processor and containing said plurality of predetermined communication conditions.

44. A radio receiver in accordance with claim 43, comprising:

said memory contains said first cepstral constellation in association with one of said plurality of predetermined communication conditions.

45. A radio receiver in accordance with claim 44, comprising:
   means for generating a message to be communicated to a transmitter transmitting said plurality of carrier signals, said message containing information pertaining to said first cepstral constellation.

46. A radio receiver, comprising:
   means for receiving a plurality of carrier signals received on a corresponding plurality of carrier frequencies, said plurality of carrier signals being modulated with cepstral modulation;
   means for extracting information from said plurality of carrier signals by using cepstral demodulation on desired ones of said plurality of carrier signals; and
   means for generating cepstral modulation information for transmission to a source of said plurality of carrier signals to adjust the cepstral modulation.

47. A method of operating a radio receiver, comprising:
   receiving a plurality of carrier signals each modulated with information using cepstral modulation, said plurality of carrier signals being simultaneously received over a plurality of corresponding frequencies;
   identifying certain ones of said plurality of carrier signals to be demodulated; and
   demodulating said certain ones of said plurality of carrier signals to extract said information.

48. A method of operating a radio receiver in accordance with claim 47, wherein:
   said demodulating step utilizes cepstral demodulation.

49. A method of operating a radio receiver in accordance with claim 48, comprising:
   selecting a first cepstral constellation for use in said cepstral demodulation.

50. A method of operating a radio receiver in accordance with claim 49, comprising:
   monitoring said plurality of carrier signals for a first predetermined condition; and
   said first cepstral constellation is selected when said plurality of carrier signals has said first predetermined condition.

51. A method of operating a radio receiver in accordance with claim 50, comprising:
   monitoring said plurality of carrier signals for a second predetermined condition; and
   selecting a second cepstral constellation for use in said cepstral demodulation when said second predetermined condition occurs.

52. A method of operating a radio receiver in accordance with claim 51, comprising:
   sending information regarding said first constellation to a source of said carrier signals when said first cepstral condition occurs; and
   sending information regarding said second constellation to said source of said plurality of carrier signals when said second predetermined condition occurs.

53. A method of operating a radio receiver in accordance with claim 52, wherein:
   said first predetermined condition is a first SNR for at least one of said plurality of carrier signals.

54. A method of operating a radio receiver in accordance with claim 53, wherein:
   said second condition is a second SNR for at least one of said plurality of carrier signals.

55. A method of operating a radio receiver in accordance with claim 53, wherein:
   said second predetermined condition is a second propagation condition for at least one of said plurality of carrier signals.

56. A method of operating a radio receiver in accordance with claim 52, wherein:
   said first predetermined condition is a first propagation condition for at least one of said plurality of carrier signals.

57. A method of operating a radio receiver in accordance with claim 50, comprising:
   sending information regarding said first predetermined constellation to a source of said plurality of carrier signals.

58. A method of operating a radio transmitter, comprising:
   selecting a first cepstral modulation constellation; and
   transmitting a plurality of carrier signals each cepstrum modulated with information using said first cepstral modulation constellation, said plurality of carrier signals being simultaneously transmitted over a plurality of corresponding frequencies.

59. A method of operating a radio transmitter in accordance with claim 58, comprising:
   receiving information regarding a desired cepstral modulation constellation.

60. A method of operating a radio transmitter in accordance with claim 59, comprising:
   changing modulation of said plurality of carrier signals to said desired cepstral modulation constellation.

61. A method of operating a radio communication system comprising the steps of:
   selecting a plurality of carrier frequencies for a plurality of communication signals; and
   modulating information on said plurality of communication signals, said modulating being Wastrum modulation.

62. A method in accordance with claim 61, comprising:
   transmitting said plurality of communication signals on said plurality of carrier frequencies at randomly selected burst intervals.

63. A method in accordance with claim 62, comprising:
   receiving said plurality of signals; and
   measuring Wastrum modulation properties on a plurality of selected signals selected from said plurality of signals.

64. A method in accordance with claim 63, comprising:
   ignoring Wastrum modulation properties of unselected signals, said unselected signals comprising those signals of said plurality of communication signals that are not selected.

65. A method in accordance with claim 63, comprising:
   selecting a Wastrum constellation for said Wastrum modulation.

66. A method in accordance with claim 65, comprising:
said Wastrum constellation selection is performed in accordance with a predetermined function.

67. A method in accordance with claim 66, wherein:
said predetermined function is determined by a predetermined correlation between said Wastrum constellation and SNR of said plurality of communication signals.

68. A method in accordance with claim 61, comprising:
identifying a plurality of predetermined Wastrum constellations, each predetermined Wastrum constellation corresponding to a predetermined communication condition of a corresponding plurality of predetermined communication conditions;

monitoring predetermined conditions of said plurality of carrier frequencies; and selecting a first Wastrum constellation from said corresponding plurality of predetermined communication conditions based upon said monitored predetermined conditions of said plurality of carrier frequencies.

69. A method in accordance with claim 68, comprising:
selecting a second Wastrum constellation when said monitored predetermined communication conditions correspond to a second one of said corresponding plurality of predetermined communication conditions.

* * * * *